United States Patent [19]

Jobling et al.

[11] Patent Number: 4,698,556
[45] Date of Patent: Oct. 6, 1987

[54] TIMEBASE CIRCUIT

[75] Inventors: David T. Jobling, Geneva; Anthony D. Newton, Le Vaud, both of Switzerland

[73] Assignee: Motorola Inc., Schaumburg, Ill.

[21] Appl. No.: 739,948

[22] Filed: May 31, 1985

[51] Int. Cl.⁴ .............................................. H01J 29/56
[52] U.S. Cl. .................................................. 315/371
[58] Field of Search ................ 315/371, 411; 358/180, 358/243, 222

[56] References Cited

U.S. PATENT DOCUMENTS 4,223,252 9/1980 Doran .................................. 315/371
4,501,996 2/1985 Yamaguchi ......................... 315/371
4,574,224 3/1986 Nowaczyk ......................... 358/243

Primary Examiner—Theodore M. Blum
Attorney, Agent, or Firm—Eugene A. Parsons

[57] ABSTRACT

A timebase circuit is described, for compensation of picture dimensions of a television type display, for EHT fluctuations in which a control current is derived by multiplying a current dependent upon the picture beam current with a reference current derived from a digital to analogue converter fed with a digital code.

8 Claims, 1 Drawing Figure

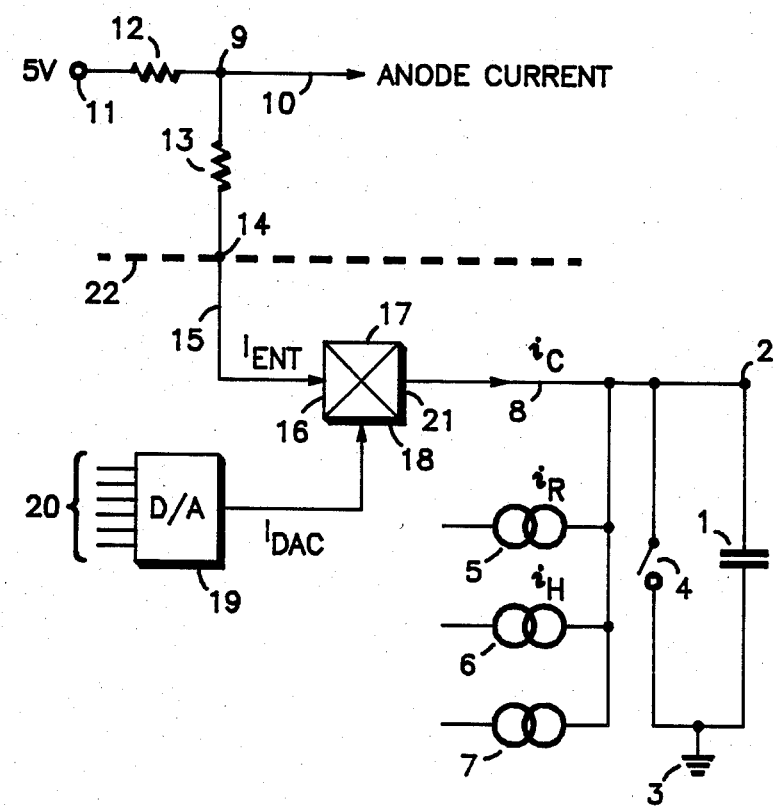

TIMEBASE CIRCUIT

FIELD OF INVENTION

This invention relates to a timebase circuit for a television type picture. The invention is particularly although not exclusively applicable to a domestic television receiver.

BACKGROUND ART

Height and width are provided in a television picture by means of timebase circuits which generate ramp currents, in order to drive the electron beam of the tube, either vertically down or horizontally across the tube. The simplest form of known timebase circuit generates a linear sawtooth waveform.

A problem occurs in known circuits due to variations in tube EHT voltage. When a picture becomes brighter the EHT voltage drops due to extra loading.

The drop in the EHT voltage causes the picture height to lengthen and the width to increase due to extra deflection of the electron beam since the electrons accelerated by a reduced EHT voltage have reduced energy when passing through the deflection coils.

This invention seeks to provide a timebase circuit in which the above mentioned problem is mitigated.

BRIEF DESCRIPTION OF INVENTION

In accordance with an aspect of the invention the picture tube beam current is monitored, changes in the current being utilised to compensate picture dimensions for changes in EHT voltage.

In accordance with a feature of the invention a multiplier is provided for multiplying a current dependent upon cathode ray tube beam current with a predetermined reference current to provide a control current.

BRIEF DESCRIPTION OF DRAWINGS

An exemplary embodiment of the invention will now be described with reference to the single figure drawing which illustrates schematically part of a television vertical time base circuit in accordance with the present invention.

DETAILED DESCRIPTION OF INVENTION

Referring to the figure the time base circuit illustrated comprises a ramp capacitor 1 coupled between a terminal 2 and a reference terminal 3 which is typically an earth terminal.

The time base waveform, which is typically a sawtooth waveform, is formed on the capacitor 1 by charging the capacitor by means of current applied to the terminal 2 and by periodically discharging the capacitor by means of a switch 4 coupled between the terminal 2 and the earth terminal 3.

The ramp voltage generated at the terminal 2 is then available for use for coupling to the vertical drive circuit of the television receiver.

Currents are supplied to the capacitor terminal 2 by means of current sources 5, 6 and 7. The current $i_R$ supplied by the current source 5 is a fixed reference current typically of the order of 6 micro amps. The current source 6 is an adjustable current source and supplies a current $i_H$ having a value of typically between 0 and 3 micro amps and allows a preset adjustment of picture height to be made by the manufacturer.

The current source 7 provides additional control of the vertical ramp and is the subject of a copending application.

A current of value $i_c$ is fed over a line 8 to the terminal 2 and provides a height compensation control current. In accordance with the present invention this current is adjusted automatically in accordance with changes in the tube beam current in order to compensate picture height for changes in tube EHT voltage.

The currents $i_R$, $i_H$ and $i_C$ depend upon the particular television line standard in use ie 525 or 625 lines and the values of these currents are changed automatically in accordance with signals from a reception standard recognition circuit.

Anode current is fed to the picuture tube from a terminal 9 over a line 10. The terminal 9 is supplied with current from a potential supply terminal 11, typically a 5 volt supply terminal, through a resistor 12. A resistor 13 couples the terminal 9 to a further terminal 14 which is itself coupled via line 15 to one input 16 of a multiplier 17.

A second input 18 of the multiplier 17 is connected to the output of digital to analogue converter 19 which receives a 6 bit digital signal at its input 20. A multiplied output signal appears at the output terminal 21 of the multiplier 17 to provide the control current $i_c$.

Anode current, supplied to the anode of the picture tube via the line 10 will produce a voltage at the terminal 9 which is dependent upon the magnitude of the anode current.

The anode current, which effectively constitutes a measure of the beam current of the tube will change when the brightness changes in the picture displayed by the tube. Such brightness changes may occur either by operator adjustment of a brightness control, or by brightness changes in the picture information supplied to the cathode of the picture tube. Consequently as the brightness of the picture changes, so the voltage at the terminal 9 will change in a representative manner.

The voltage at the terminal 9 is converted to a current $I_{EHT}$, by means of the resistor 13 and this current is fed, via the diode 15, to the input 16 the multiplier 17.

The second input 18 of the multiplier 17, receives a reference current $I_{DAC}$ from the output of the digital to analogue converter 19. The current $I_{DAC}$ is produced in response to a digital code fed to the input terminals 20 of the digital to analogue converter. The digital code, is a fixed value chosen in dependence upon the characteristics of the particular tube and EHT supply.

The currents $I_{EHT}$ and $I_{DAC}$ fed to the multiplier 17 are multiplied therein to produce the compensation current $i_C$ which compensates the picture height for changes in EHT voltage.

Utilizing the digital to analogue converter 19 to produce the multiplier current $I_{DAC}$ enables the picture height compensation current $i_C$ to be varied for different values of fixed external components by suitable adjustment of the digital value fed to the input terminals 20 of the converter 19.

The invention is particularly applicable to fabrication as an integrated circuit. All the components below the dashed line 22 with the exception of the ramp capacitor 1 may be integrated into a single chip, the terminal 2 forming a pin of the integrated circuit.

The invention has been described by way of example and modifications may be made without departing from the scope of the invention.

Although in the described embodiment the reference current $I_{DAC}$ has been derived from a digital to analogue converter, this is not essential and any convenient means may be used to supply the current. The use of the converter is particularly, advantageous in an integrated in which the present invention forms part of a microprocessor controlled single chip television signal processing circuit.

Also although the invention has been particularly described with reference to the control of picture height in a vertical timebase circuit the invention is equally applicable to the control of picture width. In that case the current $i_c$ would be supplied, not to the vertical ramp capacitor terminal 2 but to separate terminal for connection to modulate the timebase waveform generated by the horizontal timebase circuit.

Also although the invention is particularly applicable to a domestic television receiver, it is equally applicable to any television type display, and may be used for example, in monitors, computer displays and graphics type displays.

We claim:

1. A correction circuit for a television picture tube timebase comprising: means for providing an electrical signal dependent upon the instantaneous EHT voltage of the tube; means for providing an adjustable reference signal comprising a digital-to-analog converter having input means for receiving a selectable digital code and an output for providing an analog output signal; and a multiplier for multipling the electrical signal and the reference signal; to provide a correction signal for correcting at least one picture dimension for changes in EHT voltage.

2. A correction circuit for a television picture tube timebase comprising: means for providing an electrical current dependent upon the EHT voltage of the tube, said electrical current being derived from the anode current supplied to the tube; means for providing an adjustable reference current; and a multiplier for multiplying the electrical current and the reference current to provide a correction current for correcting at least one picture dimension for changes in EHT voltage.

3. A correction circuit for a television picture tube timebase comprising means for providing a first electrical current for charging a capacitor to produce a ramp voltage; means for providing a second electrical current dependent upon the picture tube beam current; means for providing an adjustable reference current; means for multiplying the second electrical current and the adjustable reference current to provide a correction current; and means for combining the first electrical current and the correction current.

4. The circuit of claim 3 wherein the means for providing an adjustable reference current comprises a digital-to-analog converter having input means for receiving a selectable digital code and an output of providing an analog output current.

5. A correction circuit for a television picture tube timebase comprising: means for providing an electrical signal dependent upon the instantaneous EHT voltage of the tube; means for providing an adjustable reference signal and a mulitplier for multiplying the electrical signal and the reference signal to provide a correction signal for correcting at least one picture dimension for changes in EHT voltage, the correction signal comprising a signal for controlling picture height.

6. The circuit of claim 25 wherein the correction signal is fed to a vertical ramp capacitor whereby the vertical ramp voltage generated on the ramp capacitor includes a component for the correction of picture height for changes in EHT voltage.

7. A correction circuit for a television picture tube timebase comprising: means for providing an electrical signal dependent upon the instantaneous EHT voltage of the tube; means for providing an adjustable reference signal and a multiplier for multiplying the electrical signal and the reference signal to provide a correction signal for correcting at least one picture dimension for changes in EHT voltage, the correction signal being fed to correct a horizontal timebase waveform to correct the picture width for changes in EHT voltage.

8. A correction circuit for a television picture tube timebase comprising: means for providing an electrical current dependent upon the EHT voltage of the tube; means for providing an adjustable reference current comprising a digital-to-analog converter having input means for receiving a selectable digital code and an output for providing an analog output current; and a multiplier for multiplying the electrical current and the reference current to provide a correction current for correcting at least one picture dimension for changes in EHT voltage.

* * * * *